(12) United States Patent
Bentolila (10) Patent No.: US 7,526,754 B2
(45) Date of Patent: Apr. 28, 2009

(54) MEMORY DEBUGGING TOOL

(75) Inventor: Ariel Bentolila, Ramat Hasharon (IL)

(73) Assignee: SAP Portals Israel Ltd., Ra'anana (IL)

( * ) Notice: Subject to any disclaimer, the term of this patent is extended or adjusted under 35 U.S.C. 154(b) by 838 days.

(21) Appl. No.: 11/068,308

(22) Filed: Feb. 28, 2005

(65) Prior Publication Data

US 2006/0195823 A1 Aug. 31, 2006

(51) Int. Cl.
*G06F 9/44* (2006.01)
*G06F 12/00* (2006.01)
(52) U.S. Cl. ...................... 717/124; 707/206
(58) Field of Classification Search ............... 717/124; 707/206
See application file for complete search history.

(56) References Cited

U.S. PATENT DOCUMENTS

| | | | | |
|---|---|---|---|---|
| 5,689,707 | A | * | 11/1997 | Donnelly .................. 707/206 |
| 6,055,492 | A | * | 4/2000 | Alexander et al. ......... 702/179 |
| 2003/0187888 | A1 | * | 10/2003 | Hayward ................... 707/206 |
| 2004/0216091 | A1 | * | 10/2004 | Groeschel ................. 717/128 |
| 2005/0210454 | A1 | * | 9/2005 | DeWitt et al. ............. 717/133 |

* cited by examiner

*Primary Examiner*—Wei Y. Zhen
*Assistant Examiner*—Philip R. Wang
(74) *Attorney, Agent, or Firm*—Buckley, Maschoff & Talwalkar LLC (57) ABSTRACT

A method for assessing memory use of a software program includes collecting records of memory allocations while running the program, the records indicating respective allocation points in the program. The records are sorted according to the respective allocation points, and the sorted records are displayed so as to enable a user to observe totals of the memory allocations at the respective allocation points. In a disclosed embodiment, stack traces are collected at the allocation points, and information regarding the stack traces is displayed for at least some of the allocation points.

18 Claims, 4 Drawing Sheets

MEMORY DEBUGGING TOOL

FIELD OF THE INVENTION

The present invention relates generally to computer software development, and specifically to tracking the amount of memory allocated by a software program.

BACKGROUND OF THE INVENTION

In early programming languages, memory allocation and deallocation was a burden imposed directly on the programmer, who was responsible for allocating and deallocating memory blocks. This burden was eased by the introduction of garbage collectors, which are programs that deallocate memory that is assigned to dead or unreachable objects. Garbage collectors have improved programmer productivity and have enhanced software reliability. They are supported by a variety of modern programming languages, such as Java™.

The Java Virtual Machine Profiler Interface (JVMPI) is a two-way function call interface between the Java virtual machine and an in-process profiler agent. The profiler agent issues controls and requests for information through the JVMPI. In response, the virtual machine notifies the profiler agent of various events, corresponding, for example, to heap allocation, thread start, etc. The JVMPI can be used by profiling tools to obtain information on memory allocation sites, CPU usage hot-spots, unnecessary object retention, and monitor contention. JVMPI is available from Sun Microsystems (Palo Alto, Calif.).

SUMMARY OF THE INVENTION

As supported in most languages, garbage collection is an asynchronous process. It is typically invoked automatically by the computer system at runtime when the amount of memory allocated by the running program reaches some limit, which depends on the amount of memory actually available in the system. The developer is generally unable to determine at any particular point in the execution of the application how many memory objects and how much total memory have actually been allocated. Excessive memory allocation will lead to long and frequent garbage collection, which may in turn degrade the performance of the application.

Embodiments of the present invention address this problem by providing the software developer with tools that can be used to track and visualize allocation of memory objects in a software program. For this purpose, a profiler collects records of memory allocations during a trial run of the program. This step generates a large volume of data, since a typical program may create thousands or even millions of objects during even a short run. Therefore, in embodiments of the present invention, the records are sorted and aggregated so as to permit the developer to see the amount of allocation that occurred at each point in the program and, typically, to bring out the most allocation-intensive program lines. The aggregated records may also include stack traces, to enable the programmer to observe the sequence of program steps leading up to points of heavy allocation. This presentation of information enables the programmer to identify, understand and debug the points of excessive memory allocation in the program.

In some embodiments, the aggregated records are stored in a relational database. The programmer can then query the database using a suitable browser.

Although the embodiments described hereinbelow relate specifically to Java programming and use Java profiling tools, the principles of the present invention may similarly be applied to track memory allocation in other programming environments.

There is therefore provided, in accordance with an embodiment of the present invention, a method for assessing memory use of a software program, the method including:

collecting records of memory allocations while running the program, the records indicating respective allocation points in the program;

sorting the records according to the respective allocation points; and displaying the sorted records so as to enable a user to observe totals of the memory allocations at the respective allocation points.

In a disclosed embodiment, collecting the records includes applying a profiling agent to receive allocation events while the program is running.

In some embodiments, collecting the records includes collecting stack traces at the allocation points, and displaying the sorted records includes displaying information regarding the stack traces for at least some of the allocation points. Typically, sorting the records includes sorting the records belonging to a given allocation point according to entries in the stack traces leading to the given allocation point. In one embodiment, displaying the sorted records includes displaying the records in a hierarchical representation having a root at the given allocation point and branches corresponding to the entries in the stack traces. Additionally or alternatively, displaying the sorted records includes displaying, together with the entries in the stack traces, the respective subtotals of the totals of the memory allocations at the given allocation point.

Further additionally or alternatively, sorting the records includes defining first and second groups of the allocation points according to the totals of the memory allocations, and displaying the information includes displaying the stack traces up to a first trace depth for the first group and up to a second trace depth, less than the first trace depth, for the second group.

In disclosed embodiments, sorting the records includes aggregating the records so as to compute, for each of at least some of the allocation points, a total number of objects allocated and a total volume of the memory allocate on all passes through the allocation points while running the program.

In an alternative embodiment, displaying the sorted records includes displaying respective class and method names of the allocation points. In this embodiment, displaying the sorted records typically includes grouping the records for display according to the class.

There is also provided, in accordance with an embodiment of the present invention, apparatus for assessing memory use of a software program, the apparatus including:

a processor, which is arranged to collect records of memory allocations while running the program, the records indicating respective allocation points in the program, and to sort the records according to the respective allocation points; and an output device, which is coupled to be driven by the processor to display the sorted records so as to enable a user to observe totals of the memory allocations at the respective allocation points.

There is additionally provided, in accordance with an embodiment of the present invention, a computer software product for assessing memory use of a software program, the product including a computer-readable medium in which program instructions are stored, which instructions, when read by a computer, cause the computer to collect records of memory allocations while running the program, the records indicating respective allocation points in the program, to sort the records according to the respective allocation points, and to display the sorted records so as to enable a user to observe totals of the memory allocations at the respective allocation points.

The present invention will be more fully understood from the following detailed description of the embodiments thereof, taken together with the drawings in which:

DETAILED DESCRIPTION OF EMBODIMENTS

Figure 1:
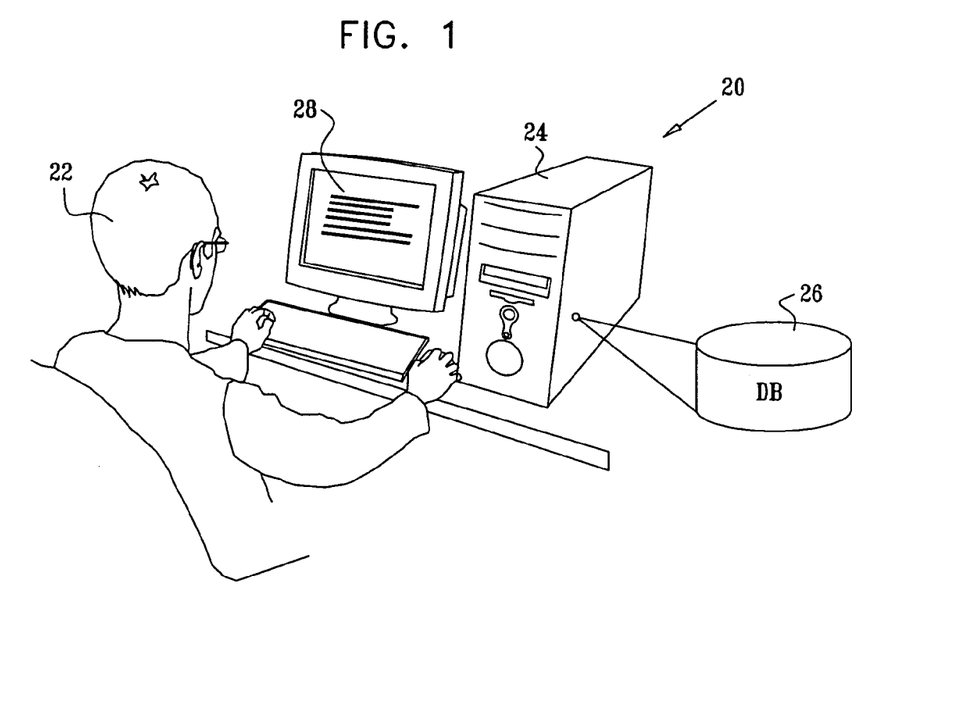
FIG. 1 is a schematic, pictorial illustration of a system for software development, in accordance with an embodiment of the present invention.

FIG. 1 is a schematic, pictorial illustration of a system 20 for software development, in accordance with an embodiment of the present invention. The system is used by a programmer 22 to run and debug a software program under development, such as a Java application. Typically, the system is built around a computer processor 24, which is programmed in software to carry out the functions described hereinbelow. This software may be downloaded to system 20 in electronic form, over a network, for example, or it may be furnished on tangible media, such as optical, magnetic or electronic memory.

The operation of system 20 is described in detail hereinbelow with reference to the figures that follow. Briefly, processor 24 runs the program under test and records memory allocations that occur during the program. These records are sorted, aggregated and then stored in a database in a memory 26. Alternatively, other sorts of data structures, as are known in the art, may be used to hold the results. Programmer 22 can then query and browse the results in the database using a suitable output device 28, such as a computer monitor. In this manner, the programmer is able to identify and understand points of excessive memory allocation in the program under development. The programmer may then revise the software code to enhance the memory-efficiency of the program, and then may run the program again in system 20 until the desired results are achieved.

Figure 2:
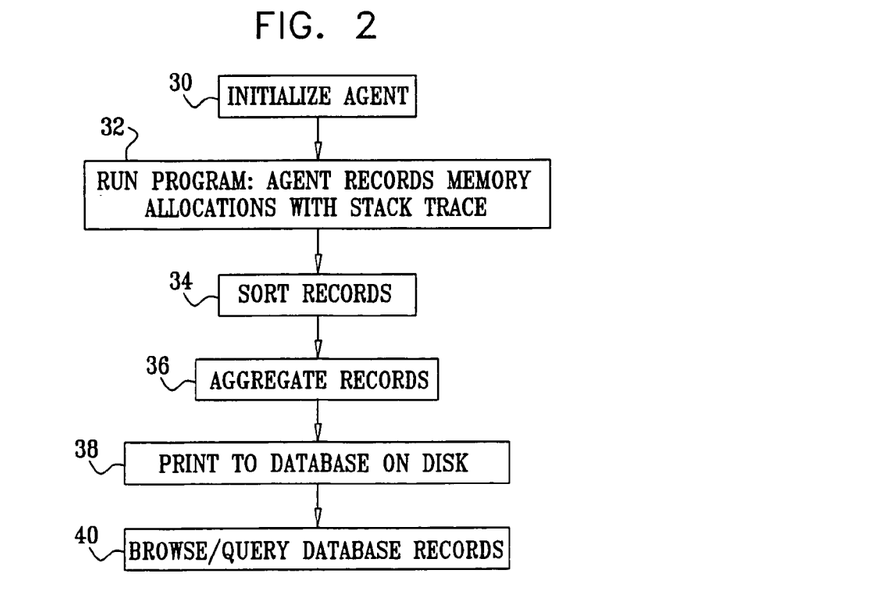
FIG. 2 is a flow chart that schematically illustrates a method for tracking and visualizing memory allocations in a software program, in accordance with an embodiment of the present invention.

FIG. 2 is a flow chart that schematically illustrates a method for tracking and visualizing memory allocations using system 20, in accordance with an embodiment of the present invention. The method uses the JVMPI, as described above, which notifies a specified profiler agent of certain specified events that occur during running of the program under test. As defined in the JVMPI specification, the agent is a dynamic link library (DLL)/shared object, which is loaded by the Java Virtual Machine (VM) in response to an appropriate Java command. Arguments of the command specify the name of the agent to load. The agent is a software routine written in native code, such as C or C++, which runs on processor 24 together with the program under test. The agent registers events in the VM that are reported via the JVMPI.

The profiler agent is initialized by the Java VM, at an agent initialization step 30. The agent specifies the types of events that should be reported to it by calling the JVMPI method RequestEvent. To trace object allocations, the agent requests that the JVMPI report JVMPI_EVENT_OBJECT_ALLOC events, which causes the JVMPI to report all allocations. In the present embodiment, the request is accompanied by the interface function JVMPI_CallTrace, which causes the JVMPI to output a stack trace of the thread that performed the allocation together with each allocation event. (Generating a trace for every memory allocation in this manner produces a very large volume of information, which is then organized using the methods described hereinbelow so that the programmer will be able to use the information.) The agent indicates the length of the stack trace (i.e., the number of frames in the trace) to be reported. The programmer may specify the desired length, based on a heuristic tradeoff between the amount of information provided for each allocation and the memory and processing limitations of processor 24. The programmer may also specify filters, so that the JVMPI reports only those allocation events that meet certain criteria. For example, the JVMPI may be instructed to report only events that originate from a specified class name. Alternatively or additionally, the agent may be programmed to filter the events it receives and to record only those events that meet certain filtering criteria.

Processor 24 runs the program under test, at a run step 32. For every allocation reported by the JVMPI during the run, the profiler agent creates a record containing the allocation information, such as the object size and the type of object, if provided, and the stack trace. The JVMPI represents each frame in the stack trace as a pair of long numbers: <method ID, line number>. These numbers may be resolved to give the class name and method name, but the resolution is typically delayed to a later stage in order to improve the performance of step 32. Step 32 may continue until the program under test finishes running. Alternatively, the agent may be instructed to start and stop collecting allocation information at desired points during execution of the program under test, without necessarily exiting or restarting the program. The agent may have a suitable interface, such as a Telnet interface, that permits this sort of remote control.

The result of step 32 is a long list of allocations in order of occurrence. In order to present the allocation information in a way that is useful to programmer 22, processor 24 sorts the allocation records by allocation point, at a sorting step 34. (The "allocation point" of a given allocation is the line in the program at which the allocation event occurred.)

For example, assume the following records were accumulated at step 32:

TABLE I

UNSORTED ALLOCATION RECORDS

| # | alloc. size | depth = 0 | depth = 1 | depth = 2 | depth = 3 |
|---|---|---|---|---|---|
| 1 | 10 | <125, 10> | <2534, 20> | <4350, 30> | <150, 40> |
| 2 | 10 | <400, 45> | <1333, 40> | — | — |
| 3 | 10 | <125, 10> | <2522, 25> | <233, 50> | <250, 40> |
| 4 | 10 | <400, 42> | <455, 40> | <546, 66> | <666, 76> |
| 5 | 15 | <125, 10> | <2534, 20> | <555, 88> | <987, 44> |

In this table, the "depth=0" entries represent the allocation points, listed by <method ID, line number>. The subsequent entries in each row are the succeeding elements in the stack trace for the allocation event in question. The allocation records are sorted at step 34 by method ID and line number beginning from the allocation point and then moving down the stack traces. In other words, first the records are grouped by the depth=0 values. Within these groups, the records are grouped by the depth=1 values, and so forth up to the maximum recorded depth:

TABLE II

SORTED ALLOCATION RECORDS

| # | alloc. size | depth = 0 | depth = 1 | depth = 2 | depth = 3 |
|---|---|---|---|---|---|
| 1 | 10 | <125, 10> | <2522, 25> | <233, 50> | <250, 40> |
| 2 | 15 | <125, 10> | <2534, 20> | <555, 88> | <987, 44> |
| 3 | 10 | <125, 10> | <2534, 20> | <4350, 30> | <150, 40> |
| 4 | 10 | <400, 42> | <455, 40> | <546, 66> | <666, 76> |
| 5 | 10 | <400, 45> | <1333, 40> | — | — |

The volume of the recorded data, however, is still very large. To reduce the data volume and enhance performance of present debugging tool, the results may be further sorted by the amount of memory allocation at each allocation point. For each allocation point, the total allocation is determined by summing the allocation size over all the records belonging to this allocation point. The full stack trace is then saved only for the "top N" allocation points, i.e., the N allocation points with the greatest total allocation size and/or greatest total number of allocation events. The value of N may be configured by programmer 22. For the remaining allocation points, only an abbreviated stack trace (which may be abbreviated down to no stack trace at all) is saved.

Further details of the sort procedures carried out at step 34 are described hereinbelow with reference to FIG. 3. A source code listing of a procedure that can be used for record sorting at step 34 is given below in Appendix A.

Processor 24 next aggregates the records that have the same allocation point in order to give a consolidated view of the allocations, at an aggregation step 36. In this view, each stack entry in the sorted allocation list above is listed along with its cardinality (i.e., the number of allocation events, which is equal to the number of consecutive occurrences of the entry in the sorted list) and the total allocation of all these occurrences:

TABLE III

AGGREGATED ALLOCATION RECORDS

| from | to | alloc. size | |
|---|---|---|---|
| 1 | 3 | 35 | <125, 10> *3 |
| 1 | 1 | 10 | <2522, 25> |
| 1 | 1 | 10 | <233, 50> |
| 1 | 1 | 10 | <250, 40> |
| 2 | 3 | 25 | <2534, 20> *2 |
| 2 | 2 | 15 | <555, 88> |
| 2 | 2 | 15 | <987, 44> |
| 3 | 3 | 10 | <4530, 30> |
| 3 | 3 | 10 | <150, 40> |
| 4 | 5 | 20 | <400, 42> *2 |
| 4 | 4 | 10 | <455, 40> |
| 4 | 4 | 10 | <546, 66> |
| 4 | 4 | 10 | <666, 76> |
| 5 | 5 | 10 | <1333, 40> |

In the above table, the columns "from" and "to" refer to the numbers of the corresponding rows in Table II, while the figures marked with "*" following certain <method ID, line number> pairs indicate the cardinality of the corresponding entries. This information is useful subsequently in browsing through the results and associating the aggregated records with the raw event listings.

Processor 24 now stores the aggregated records in a database file on storage device 26, at a storage step 38. In practice, the aggregation of results in step 36 is done implicitly while printing the results to a disk-file in step 38. During step 38, the method ID and line number of each record are translated into the appropriate <class name>.<method name>. The profiler agent obtains the class name corresponding to each method ID by invoking the RequestEvent method to ask the JVMPI to report JVMPI_EVENT_CLASS_LOAD events. The agent caches the loaded classes in its memory to avoid having to ask for the same class name multiple times.

Each record in the database created in storage device 26 at step 38 contains the following fields, corresponding to the elements of the aggregated record list generated at step 36 (as illustrated above in Table III):

TABLE IV

ALLOCATION DATABASE

| Field | Meaning |
|---|---|
| UID | int - A unique ID assigned to each record |
| PID | int - UID of the record that is the parent of this record (or 0 for allocation points) |
| AID | int - The UID of the allocation point for a stack trace (for allocation points AID = UID) |
| SCENARIO_NAME | varchar(20) - Allows more than one scenario per table |
| START_ID | int - See Table III: from |
| END_ID | int - See Table III: to |
| SEQ | int - The stack depth |
| CLASS | varchar(250) - The Java class name (including the package) |
| METHOD | varchar(50) - The Java method name |
| LINE | int - The line number in the Java code |
| TYPE | varchar(20) - The type of object allocated (int, char, char[ ], object, etc.) |
| ALLOC_CLASS | varchar(250) - The class name, if type is object |
| TIMES | int - the cardinality of this allocation/stack trace |
| SIZE | bigint - The sum of memory allocated in this allocation point/stack trace |

Figure 4:
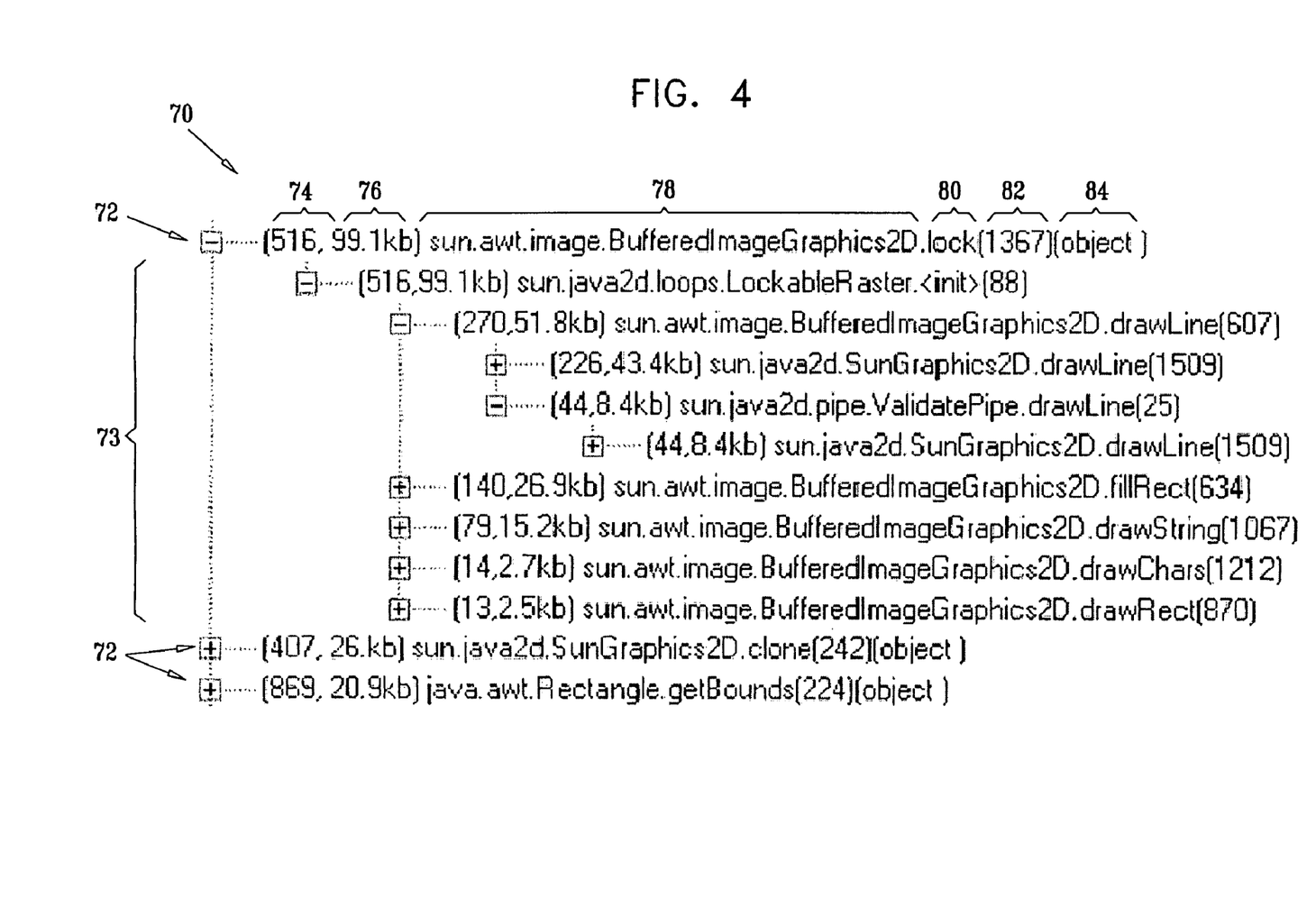
FIGS. 4 and 5 are schematic representations of a user interface for visualizing memory allocation points, in accordance with an embodiment of the present invention.
Figure 5:
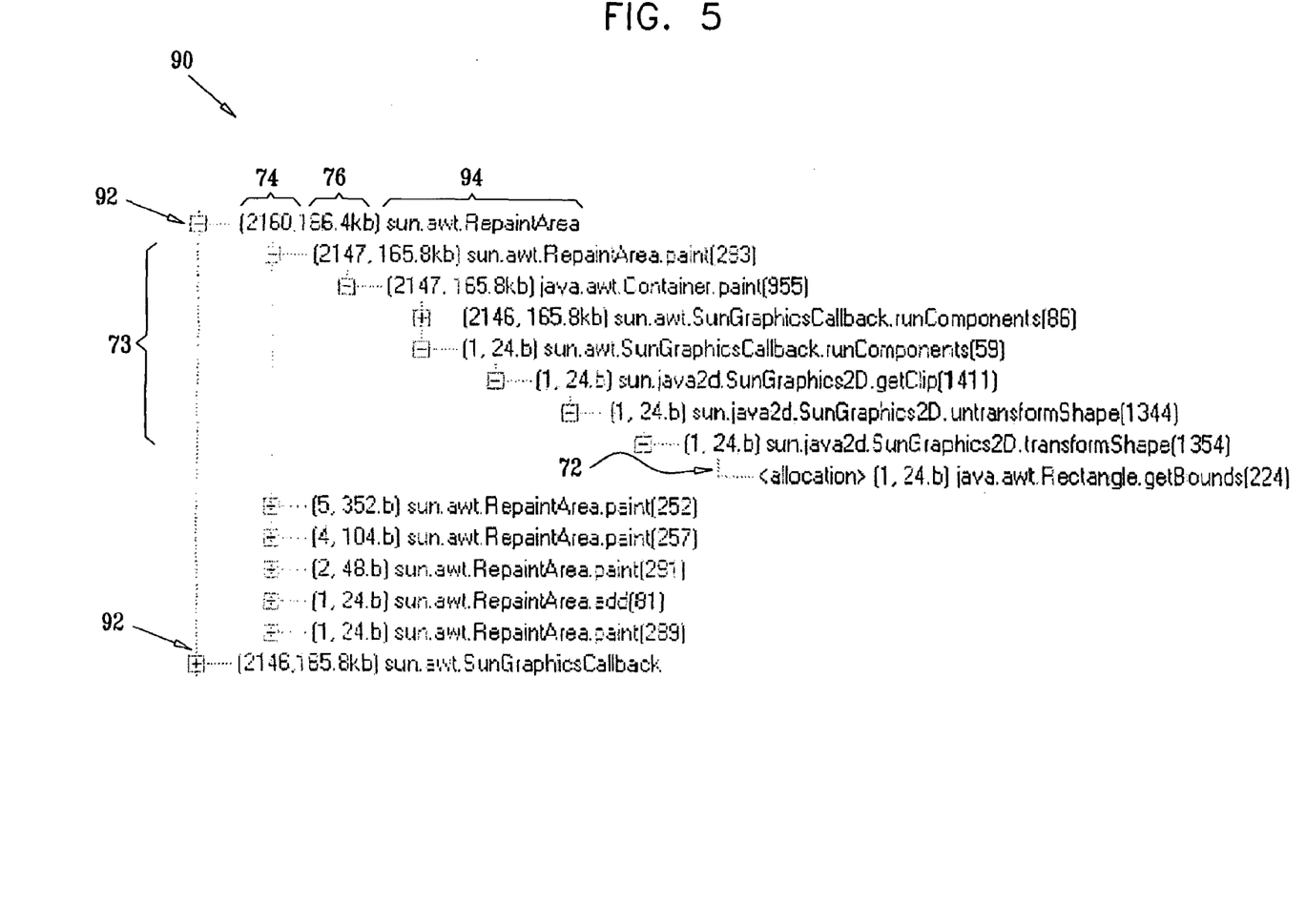

After organizing the allocation records in the database in the manner, the results are ready for browsing by programmer 22, at a browsing step 40. The browser screen on output device 28 typically uses a nested hierarchical display model, as shown in FIGS. 4 and 5 below. The programmer may select the records to view using a suitable query language, such as SQL.

Figure 3:
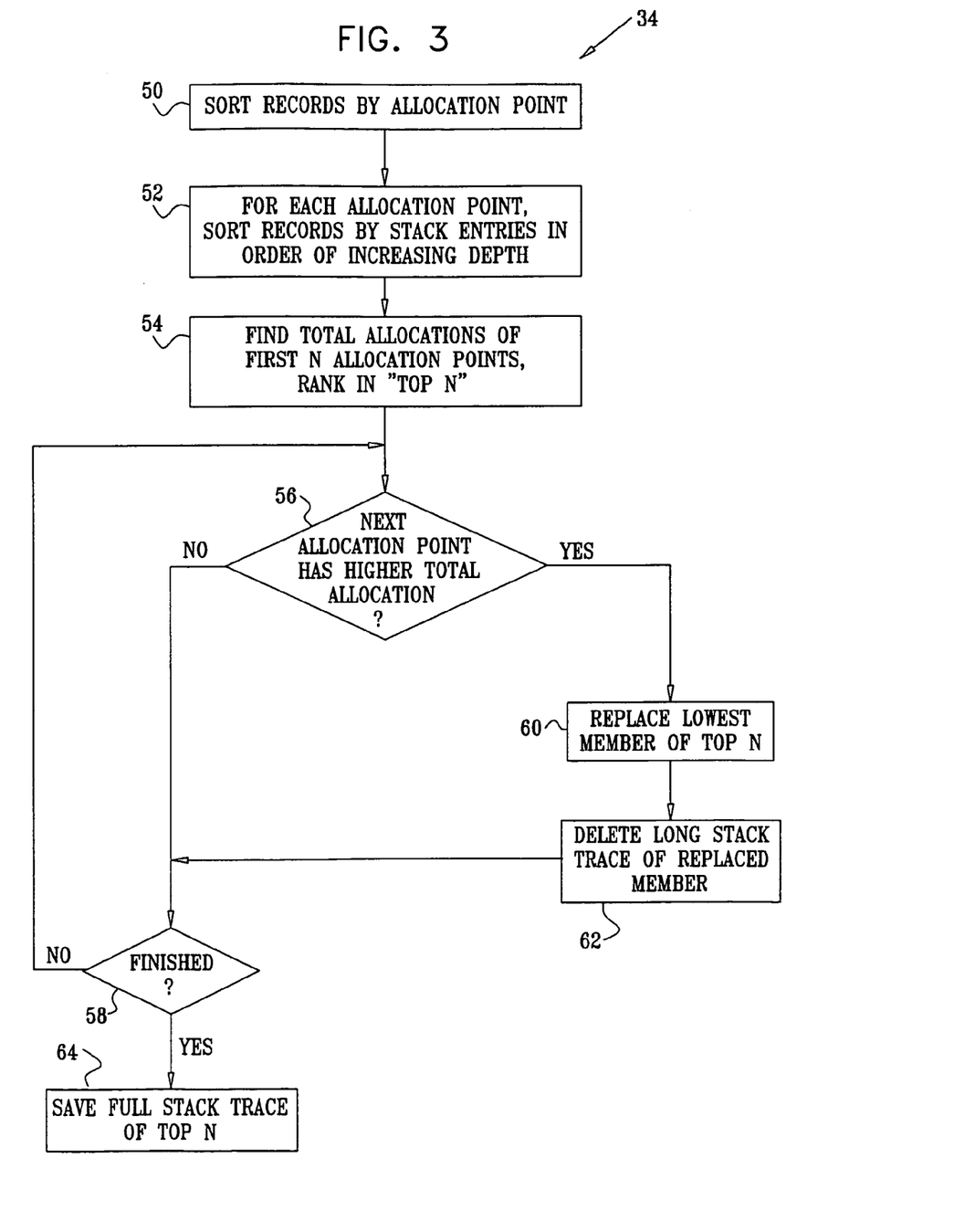
FIG. 3 is a flow chart that schematically illustrates a method for sorting records of memory allocations, in accordance with an embodiment of the present invention.

FIG. 3 is a flow chart that schematically shows details of sorting step 34, in accordance with an embodiment of the present invention. As noted above, processor 24 sorts the records by allocation point, at an allocation sorting step 50. It then sorts the records for each allocation point by the successive stack trace entries, in order of increases depth within the stack, at a stack sorting step 52. Appendix A shows an exemplary implementation of these steps.

Next, processor 24 identifies the top N allocation points, i.e., a certain number (N) of lines in the program that have the largest cumulative allocations. To identify the top N, the processor begins by putting the first N allocation points from the list generated at step 50 into a "top N" array, at an initial ranking step 54. For each allocation point, the processor calculates the total allocation of memory over all occurrences of the allocation point (corresponding to the "alloc. size" field in Table III).

The processor then proceeds to the next allocation point in the list, at a next point test step 56. If the total memory allocation at the next allocation point is less than the total allocation of any of the top N, the processor makes no change in the top N listing, but simply checks whether any more allocation points remain to be evaluated, at a termination checking step 58. On the other hand, if the total memory allocation at the next allocation point is greater than at least one of the top N, this allocation point is inserted into the top N array, at a top N replacement step 60. The current member of the top N with the lowest total memory allocation is concurrently removed from the top N. As noted earlier, processor 24 may be configured to save long stack traces for the top N allocation points, and shorter stack traces (possibly down to zero length) for the remaining allocation points. The entries in the stack traces of the allocation points that are removed from the top N are therefore deleted down to this shorter length, at a trace cutting step 62. The process continues in this manner through step 58 until all allocation points have been evaluated.

After choosing in this manner the allocation points that are to be ranked in the top N, processor 24 saves long stack traces of these allocation points, at a stack saving step 64. The processor saves shorter stack traces for the remaining allocation points.

FIG. 4 is a schematic representation of a browser screen 70, which is used to display the memory allocation results in the database at step 40, in accordance with an embodiment of the present invention. Each allocation point 72 appears as the root of a hierarchical tree, with branches 73 corresponding to the succeeding entries in the stack traces that terminate on the allocation point. Each row in screen 70 corresponds to a row in the aggregated data view, as exemplified in Table III above. The user may select the "+" and "−" symbols at the left of each row to hide or reveal the branches below it in the hierarchy.

Each row in screen 70 corresponds to a line in the program under test. Each row begins with a cardinality 74 and a data size 76. These figures correspond respectively to the cardinality and alloc. size fields in the aggregated data view of Table III. Thus, for allocation points 72, the cardinality and data size indicate the number of allocations (objects) and total size of the objects allocated at the data point. For branches 73, these figures indicate the number of times the program flow passed through the corresponding program line on the way to allocation at the root allocation point and the total size of the objects that were allocated as a result. In other words, in each of branches 73, cardinality 74 and data size 76 represent the subtotals for this branch of the total number and size of allocations at the root allocation point. It may thus be observed that of the 516 objects, totaling 99.1 kb, that were allocated at the line represented by the first row in screen 70, nearly half the total (226 objects, totaling 43.4 kb) resulted from program flows that passed through the line represented by the fourth row in the table. Programmer 22 may thus identify memory-intensive parts of the program flow and may use this information to identify and debug problematic sequences of steps in the program.

Each row in the screen is further identified by a class 78 and a method name 80. A line number 82 indicates the line in the Java code. For allocation points, an object type 84 gives the type of object that was allocated by this line.

FIG. 5 is a schematic representation of a browser screen 90 that gives a different view of the results in the database, in accordance with another embodiment of the present invention. This screen is also invoked by an appropriate query to the database. In this case, the roots of the tree are classes 92, which are identified by class names 94. Cardinality 74 and data size 76 indicate the number and volume of memory allocations made from this class. Allocation points 72 themselves appear as leaves of the tree. This display allows the programmer to identify and debug the classes that are responsible for large amounts of allocation.

Other modes of display and details that may be collected and added to the database and display, regarding memory allocation points and their stack traces, will be apparent to those skilled in the art and are considered to be within the scope of the present invention. More generally, although the examples described above relate specifically to Java, the principles of the present invention may similarly be applied in creating software development and debugging tools for other object-oriented languages, particularly languages that use garbage collection.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

"QUICK SORT"

In one embodiment, record sorting at step 34 (FIG. 2) uses the quick sort algorithm, which is defined as follows:

```
    qsort(traceArray, arraySize, sizeof(MyCallTrace*),
        CompareTraces);
traceArray - array of all records of allocations (array
    of MyCallTrace)
arraySize - size of the array
sizeof(MyCallTrace*) - size of each element in the array
CompareTraces - method for comparing to records, as
    follows:
int CompareTraces(const void * a, const void * b)
{
    MyCallTrace *t1 = *(MyCallTrace**)a;
    MyCallTrace *t2 = *(MyCallTrace**)b;
    long mid,lnum;
    short minDepth = t1->num_frames < t2->num_frames?
        t1->num_frames : t2->num_frames;
    for (short depth = 0;depth < minDepth;depth ++)
    {
        mid = (long)t1->frames[depth].method_id −
            (long)t2->frames[depth].method_id;
        lnum = t1->frames[depth].lineno − t2-
            >frames[depth].lineno;
        if (mid < 0 || (mid == 0 && lnum < 0))
        {
            return −1;
        }
        else if (mid > 0 || (mid == 0 && lnum > 0))
        {
            return 1;
        }
    }
    return (t1->num_frames − t2->num_frames);
}
MyCallTrace is a structure that contains the record of
each allocation:
struct MyCallTrace
{
    // number of frames in this trace
    jint num_frames;
    // stack frames -defined by JVMPI <line number,
        method id>
    JVMPI_CallFrame *frames;
    // a structure describing the allocated object
        (size, isArray, class, obj_id etc.)
    my_obj_alloc obj_alloc;
```

APPENDIX A-continued

"QUICK SORT"

```
    // a flag that indicates whether this record belongs
        to the top N allocation points)
        bool isTopN;
};
```

APPENDIX B

AGGREGATION

```
In one embodiment, aggregation at step 36 uses the
following recursive algorithm, which is performed while
printing the results to the disk-file at atep 38:
Iterate over the traceArray (array of sorted records of
    allocations) .
For each record, call the printEntry method:
    Long PrintEntry(traceArray, currentIndex,
        recursionDepth, arraySize, maxTraceDepth)
traceArray - array of records
recursionDepth - used for indentation in the file, for a
    readable file format
arraySize - number of allocation records
maxTraceDepth - at each call to printEntry, the max stack
    trace depth is defined. This feature may be used to
    create different trace depths for the top N
    allocation points.
The return value, long, indicates how many records were
aggregated
    and should be skipped in the array.
long PrintEntry(traceArray, currentIndex, recursionDepth,
    arraySize, maxTraceDepth)
{
    If (recursionDepth >= traceArray[currentIndex]->num_frames
        Return 1;
    long skipNum = 1;
    long memory = traceArray[currentIndex]->obj_alloc.size;
    for (long compactIndex = currentIndex + 1;compactIndex <
        arraySize;compactIndex++)
    {
        if (recursionDepth <= gTrace[compactIndex]->num_frames &&
            traceArray[index]->frames[depth].method_id ==
            traceArray[compactIndex]->frames[depth].method_id &&
            traceArray[compactIndex]->frames[depth].lineno ==
            traceArray[compactIndex]->frames[depth].lineno)
        {
            //same trace line
            skipNum++;
            memory += traceArray[compactIndex]->obj_alloc.size;
        }
        else
        {
            break;
        }
    }
    if (depth == 0)
        //...Print the record 'traceArray[compactIndex]' to the
            file as allocation point
    else
        //...Print the record 'traceArray[compactIndex]' to the
            file as stack trace, with indentation
    if (maxTraceDepth < 0 || recursionDepth < maxTraceDepth)
    {
        long inIndex = compactIndex;
        while (inIndex < compactIndex + skipNum)
        {
            inIndex += PrintEntry(inIndex, recursionDepth + 1,
                compactIndex + skipNum, maxTraceDepth);
        }
    }
    return skipNum;
}
```

The invention claimed is:

1. A method for assessing memory use of a software program, the method comprising:

collecting records of memory allocations while running the program, the records indicating respective allocation points in the program, wherein collecting the records includes collecting stack traces at the allocation points;

sorting the records according to the respective allocation points, wherein said sorting includes dynamically defining a first group of allocation points and a second group of allocation points based on total memory allocations associated with each allocation point, the allocation points in the first set being associated with higher total memory allocations;

storing long stack traces, up to a first trace depth, for the allocation points in the first group and short stack traces, up to a second trace depth less than the first trace depth, for the allocation points in the second group; and retrieving and displaying the stored records so as to enable a user to observe totals of the memory allocations at the respective allocation points, wherein displaying the stored records includes displaying information regarding long stack traces for allocation points in the first group and short stack traces for allocation points in the second group.

2. The method according to claim 1, wherein collecting the records comprises applying a profiling agent to receive allocation events while the program is running.

3. The method according to claim 1, wherein sorting the records comprises sorting the records belonging to a given allocation point according to entries in the stack traces leading to the given allocation point.

4. The method according to claim 3, wherein displaying the sorted records comprises displaying the records in a hierarchical representation having a root at the given allocation point and branches corresponding to the entries in the stack traces.

5. The method according to claim 3, wherein displaying the sorted records comprises displaying, together with the entries in the stack traces, the respective subtotals of the totals of the memory allocations at the given allocation point.

6. The method according to claim 1, wherein sorting the records comprises aggregating the records so as to compute, for each of at least some of the allocation points, a total number of objects allocated and a total volume of the memory allocate on all passes through the allocation points while running the program.

7. The method according to claim 1, wherein displaying the sorted records comprises displaying respective class and method names of the allocation points.

8. The method according to claim 7, wherein displaying the sorted records comprises (i) initially grouping the records for display according to the class and (ii) then grouping, under the initial grouping, the records for display according to a hierarchical tree representation having allocation points as leaves of the tree.

9. Apparatus for assessing memory use of a software program, the apparatus comprising:

a processor, which is arranged to:

collect records of memory allocations while running the program, the records indicating respective allocation points in the program, wherein collecting the records includes collecting stack traces at the allocation points;

sort the records according to the respective allocation points, wherein said sorting includes dynamically defining a first group of allocation points and a second group of allocation points based on total memory allocations associated with each allocation point, the allocation points in the first set being associated with higher total memory allocations;

store long stack traces, up to a first trace depth, for the allocation points in the first group and short stack traces, up to a second trace depth less than the first trace depth, for the allocation points in the second group; and retrieve and display the stored records so as to enable a user to observe totals of the memory allocations at the respective allocation points, wherein displaying the stored records includes displaying information regarding long stack traces for allocation points in the first group and short stack traces for allocation points in the second group; and an output device, which is coupled to be driven by the processor to display the stored records so as to enable a user to observe totals of the memory allocations at the respective allocation points.

10. The apparatus according to claim 9, wherein the processor is adapted to apply a profiling agent to receive allocation events while the program is running.

11. The apparatus according to claim 9, wherein the processor is adapted to collect stack traces at the allocation points, and to drive the output device to display information regarding the stack traces for at least some of the allocation points.

12. The apparatus according to claim 11, wherein the processor is adapted to sort the records belonging to a given allocation point according to entries in the stack traces leading to the given allocation point.

13. The apparatus according to claim 12, wherein the processor is adapted to drive the output device to display the records in a hierarchical representation having a root at the given allocation point and branches corresponding to the entries in the stack traces.

14. The apparatus according to claim 11, wherein the processor is adapted to sort the allocation points into first and second groups according to the totals of the memory allocations, and to drive the output device to display the stack traces up to a first trace depth for the first group and up to a second trace depth, less than the first trace depth, for the second group.

15. The apparatus according to claim 9, wherein the processor is arranged to aggregate the records so as to compute, for each of at least some of the allocation points, a total number of objects allocated and a total volume of the memory allocate on all passes through the allocation points while running the program.

16. The apparatus according to claim 9, wherein the processor is adapted to drive the output device to display respective class and method names of the allocation points.

17. The apparatus according to claim 16, wherein the processor is adapted to (i) initially group the records for display according to the class and (ii) then group, under the initial groups, the records for display according to a hierarchical tree representation having allocation points as leaves of the tree.

18. A computer software product for assessing memory use of a software program, the product comprising a computer-readable medium in which program instructions are stored, which instructions, when read by a computer, cause the computer to perform a method comprising:

collecting records of memory allocations while running the program, the records indicating respective allocation points in the program, wherein collecting the records includes collecting stack traces at the allocation points;

sorting the records according to the respective allocation points, wherein said sorting includes dynamically defining a first group of allocation points and a second group of allocation points based on total memory allocations associated with each allocation point, the allocation points in the first set being associated with higher total memory allocations;

storing long stack traces, up to a first trace depth, for the allocation points in the first group and short stack traces, up to a second trace depth less than the first trace depth, for the allocation points in the second group; and retrieving and displaying the stored records so as to enable a user to observe totals of the memory allocations at the respective allocation points, wherein displaying the stored records includes displaying information regarding long stack traces for allocation points in the first group and short stack traces for allocation points in the second group.

* * * * *